US008753995B2

(12) United States Patent
Song et al.

(10) Patent No.: US 8,753,995 B2
(45) Date of Patent: Jun. 17, 2014

(54) CERAMIC DIELECTRIC MATERIAL MATCHED WITH NICKEL INTERNAL ELECTRODE AND METHOD FOR PRODUCING CAPACITOR USING SAME

(75) Inventors: Beibei Song, Zhaoqing (CN);
 Yongsheng Song, Zhaoqing (CN);
 Fangce Mo, Zhaoqing (CN); Juan Li,
 Zhaoqing (CN); Xiaoguo Wang,
 Zhaoqing (CN); Jinghua Guo, Zhaoqing
 (CN)

(73) Assignee: Guangdong Fenghua Advanced Technology Holding Co., Ltd., Zhaoqing (CN)

( * ) Notice: Subject to any disclaimer, the term of this patent is extended or adjusted under 35 U.S.C. 154(b) by 20 days.

(21) Appl. No.: 13/377,515

(22) PCT Filed: Dec. 20, 2010

(86) PCT No.: PCT/CN2010/079975
§ 371 (c)(1),
(2), (4) Date: Dec. 9, 2011

(87) PCT Pub. No.: WO2011/076091
PCT Pub. Date: Jun. 30, 2011

(65) Prior Publication Data
US 2012/0268862 A1    Oct. 25, 2012

(30) Foreign Application Priority Data
Dec. 22, 2009    (CN) .......................... 2009 1 0214107

(51) Int. Cl.
 *C04B 35/00* (2006.01)
 *H01L 27/108* (2006.01)
 *H01L 29/94* (2006.01)
(52) U.S. Cl.
 USPC ............ 501/135; 501/134; 257/296; 257/306
(58) Field of Classification Search
 USPC ................. 501/134, 135; 428/702, 699, 701;
 257/410, 288, 296, 306, 313
See application file for complete search history.

(56) References Cited

U.S. PATENT DOCUMENTS

| 5,065,275 | A | * | 11/1991 | Fujisaki et al. ............ 361/321.4 |
| 6,008,151 | A | * | 12/1999 | Sasaki et al. ................... 501/17 |
| 6,602,623 | B1 | | 8/2003 | Mizutani et al. |
| 7,518,199 | B2 | * | 4/2009 | Shimizu et al. ............... 257/411 |
| 2005/0005420 | A1 | * | 1/2005 | Hirano et al. .................. 29/593 |
| 2005/0176575 | A1 | * | 8/2005 | Chiu et al. ..................... 501/134 |
| 2006/0163676 | A1 | * | 7/2006 | Shimizu et al. ............... 257/410 |

FOREIGN PATENT DOCUMENTS

| CN | 1673174 | A | 9/2005 |
| CN | 1801417 | A | 7/2006 |
| CN | 101786864 | A | 7/2010 |
| JP | 1141838 | A | 6/1989 |

OTHER PUBLICATIONS

Lee et al. Influence of SiO2 Addition on the Dielectric Properties and Microstructure of (Ba0.96Ca0.04)(Ti0.85Zr0.15)O3 Ceramics. Int J App Ceram Technol, 6 [6] 692-701 (2009).*
International Search Report Dated Mar. 24, 2011 from PCT/CN2010/079975.

* cited by examiner

*Primary Examiner* — Noah Wiese
(74) *Attorney, Agent, or Firm* — Ohlandt, Greeley, Ruggiero & Perle, L.L.P.

(57) ABSTRACT

A high-frequency and low-dielectric-constant ceramic dielectric material matched with nickel internal electrode and a method for producing capacitor using same. The ceramic dielectric material consists of main crystalline phase, modifying additive and sintering flux. The main crystalline phase is $MgZr_xSi_{(1-x)}O_3$, wherein $0.05 \leq x \leq 0.15$. The modifying additive is one or more of $MnO_2$, $Al_2O_3$, $CaO$, $Bi_2O_3$ and $TiO_2$, and the sintering flux is one or more of $B_2O_3$, $SiO_2$, $ZnO$, $Li_2O$, $K_2O$ and $BaO$. The ceramic dielectric material has good uniformity, and excellent dielectric properties, meets the requirements of COG characteristics in EIA standard, and meets the environmental requirements. The ceramic dielectric material can be sintered under the reducing atmosphere and can be matched with nickel electrodes. The chip multilayer ceramic capacitor made of the ceramic dielectric material and nickel internal electrodes has stable performance.

17 Claims, No Drawings

CERAMIC DIELECTRIC MATERIAL MATCHED WITH NICKEL INTERNAL ELECTRODE AND METHOD FOR PRODUCING CAPACITOR USING SAME

FIELD OF TECHNOLOGY

The present invention relates to a ceramic dielectric material and a method for producing capacitor using same, in particular to a high-frequency and low-dielectric-constant ceramic dielectric material which meets the requirements of COG characteristics, can be sintered under reducing atmosphere and can be matched with nickel internal electrodes, and to a method for producing multilayer capacitor using same.

BACKGROUND

With the infiltration and expansion of electrical information technology in every technical field multilayer ceramic capacitors (hereinafter MLCC), as an important electronic component, is developing as rapidly as large-scale integrated circuits. Today's MLCC technology has trends towards: miniaturized capacitors, large-capacitance low-voltage capacitors, chip capacitors, high-voltage series capacitors, and capacitors with base-metal internal electrodes. In particular, large-scale applications of nickel-electrode MLCC are most prominent. Nickel-electrode MLCC is mainly characterized in that: 1) nickel electrodes are less expensive; 2) electromigration rate of nickel atoms or radicals is slower than that of palladium-silver radicals thereby having better electrochemical stability; 3) nickel electrodes have high corrosion resistance and heat resistance to welding flux, thus having reliable processing stability; and 4) lower equivalent series resistance and better impedance-frequency properties.

In regards to high-frequency and low-dielectric-constant MLCCs (with dielectric constants less than 15), palladium-silver-based systems are still prevailing both in China and overseas. Chinese patent application 200310117638.5 discloses a high-frequency and low-dielectric-constant thermostable ceramic dielectric material and MLCC using same. The invented ceramic dielectric material consists of main crystalline phases and auxiliary components, wherein the main crystalline phases are $Mg_{(1-x)}Zn_xTiO_3$ ($0.00010.05 \le X \le 0.05$) and $Mg_{(2-y)}Zn_ySiO_4$ ($0.0001 \le X \le 0.05$), and the auxiliary components include one or more of ZnO, $Al_2O_3$, SrO, $B_2O_3$, $Nd_2O_3$, $MnO_2$, $Co_3O_4$, $K_2O$, $Fe_2O_3$, $CeO_2$ and SnO. The dielectric constant of the MLCC is in a range of 10~20, which exhibits high frequency characteristics and good dielectric properties. However, the production cost of MLCC based on this method is fairly high because of the use of Ag—Pd internal electrodes.

SUMMARY

The technical problem to be solved by the present invention is to provide a high-frequency and thermostable low-dielectric-constant ceramic dielectric material that can be sintered under reducing atmosphere and meets environmental requirements.

In order to solve the above-mentioned technical problem, the present invention provides a high-frequency and low-dielectric-constant ceramic dielectric material matched with nickel electrodes, which comprises main crystalline phase, modifying additive and sintering flux. The main crystalline phase is $MgZr_xSi_{(1-x)}O_3$, wherein $0.05 \le x \le 0.15$; the modifying additive is one or more of $MnO_2$, $Al_2O_3$, CaO, $Bi_2O_3$ and $TiO_2$; and the sintering flux is one or more of $B_2O_3$, $SiO_2$, ZnO, $Li_2O$, $K_2O$ and BaO.

Furthermore, said reduction-resistant high-frequency and low-dielectric-constant ceramic dielectric material comprises the main crystalline phase being in a range of 85~95 mol %, the modifying additive being in a range of 1.5~13 mol %, and the sintering flux being in the range of 1.5~13 mol %. Components of the modifying additive in the ceramic dielectric material comprise $MnO_2$ 0.5~3 mol %, $Al_2O_3$ 1.0~3 mol %, CaO 0~1.0 mol %, $Bi_2O_3$ 0~5.0 mol % and $TiO_2$ 0~1.0 mol %. Components of the sintering flux in the dielectric material comprise $B_2O_3$ 0.5~3.0 mol %, $SiO_2$ 0~3.0 mol %, ZnO 1.0~4.0 mol %, $Li_2O$ 0~1.0 mol %, $K_2O$ 0~1.0 mol % and BaO 0~1.0 mol %. Said main crystalline phase is obtained by ball-milling and evenly mixing $Mg(OH)_2$, $SiO_2$ and $ZrO_2$ and then precalcining the mixture of said $Mg(OH)_2$, said $SiO_2$ and said $ZrO_2$ at a temperature between 1050° C.~1200° C.

In the ceramic dielectric material of the present invention, $MgZr_xSi_{(1-x)}O_3$ is used as a main component in order to properly keep the dielectric constant ($\in_r$) at about 10. On the other hand, the contents of $SiO_2$ and $ZrO_2$ can be adjusted to achieve the desired properties.

In the abovementioned ceramic dielectric material, the modifying additive can keep the dielectric constant ($\in_r$) of the material at about 10 and adjust the dielectric constant-temperature coefficient ($\alpha_\in$) of the material of the present invention. The modifying additive can suppress the abnormal grain growth and promote uniform grain growth. This will considerably increase the compressive strength of the dielectric material, and eventually improve MLCC reliability. The modifying additive $MnO_2$ can compensate for the free electrical charge caused by ionized oxygen vacancy in the low partial pressure of oxygen, hence increases the ceramic insulation resistance. Addition of $Al_2O_3$ as a modifying additive will form minor quantities of liquid phase at the grain boundaries which will prevent overgrowing of the grains, reduce grain size, increase grain density, and improve microscopic evenness. It also improves sintering and mechanical strength of the ceramic body, which enhances MLCC performance in high frequency range and exhibits excellent frequency characteristics. However, excessive $Al_2O_3$ will lead to fragility of the ceramic material, therefore results in poor mechanical strength of ceramic and deteriorated electrical performance at high frequencies.

One of the major functions of the sintering flux is to reduce the sintering temperature of the ceramic material of the present invention, so that the ceramic dielectric material can be sintered at a temperature below 1200° C. The sintered ceramic have uniform grain growth and high density, further ensure the high reliability of MCLL. ZnO, $B_2O_3$, $SiO_2$, $K_2O$, $Li_2O$ and BaO as individual or in combination are added to ceramic as glass flux for improved sintering, providing uniform grain growth and denser dielectric layers. Through governing the contents of the sintering flux, better dielectric properties and insulation resistance of ceramic material can be achieved. Excessive sintering flux will result in high dielectric loss of the ceramic capacitor and declined physical strength and decreased dielectric constant of the ceramic dielectric material. On the other hand, deficiency of sintering flux will cause difficult sintering process.

In the present invention, the main crystalline phase is obtained by ball-milling and mixing a composition of $Mg(OH)_2$, $SiO_2$ and $ZrO_2$ and then calcining its mixture thereof at a temperature between 1050° C. □~1200° C. for a period of tens of minutes to tens of hours, preferably 2~3 hours. In the present invention, nickel (Ni) is used for the
} internal electrodes in order to reduce the production cost. The Ni-MLCC made from said ceramic dielectric material has a dielectric constant in a range of 8~12, as well as higher rating frequencies and a wider scope of applications.

In the abovementioned reduction-resistant high-frequency and low-dielectric-constant ceramic dielectric material with nickel electrodes, a compound with excellent high-frequency properties is chosen as the main crystalline phase. The compound has a low dielectric constant, a low dielectric dissipation factor, and nearly linear dielectric-temperature characteristics all of which ensure the excellent electrical properties of MLCCs made from the dielectric material proposed in the present invention.

The method for producing MLCC using the reduction-resistant high-frequency and low-dielectric-constant ceramic dielectric material matched with nickel electrodes comprises following steps: the preparation of ceramic slurry, the fabrication of dielectric sheets, alternately screen printing internal electrodes and dielectric sheets, briquette drying, lamination, dicing, binder-removing, sintering, chamfering, termination dipping and termination firing. Nickel or nickel alloy is used as the internal electrodes. Binder-removing process refers to firing MLCC chips at a temperature between 200~300° C. to remove the organic binders and solvents. Said sintering process is to sinter MLCC chips in a reducing atmosphere for 2.5~5 hours at a temperature between 1120~1200° C. Said termination firing process refers to firing the external electrodes at a temperature between 830~900° C. followed by electroplating. Accordingly, finished MLCC are obtained. The dielectric constants of the manufactured MLCC are between 8 and 12.

In comparison with the prior art, the present invention has the following technical advantages: A non-ferroelectric, $MgZr_xSi_{(1-x)}O_3$-based system of ceramic dielectric material provided in the present invention can be sintered in a reducing atmosphere. It is reduction resistive and can be matched with nickel electrodes, eliminating co-firing problems between nickel internal electrodes and the ceramic dielectric material. Oxides, excluding hazardous elements such as lead, are added as modifying additive and sintering flux so that the ceramic dielectric material can be sintered at temperatures between 1120° C. and 1200° C. and exhibits excellent dielectric properties.

DETAIL DESCRIPTION

The main idea of the present invention is to use an $MgZr_xSi_{(1-x)}O_3$-based system as the main crystalline phase, with the addition of modifying additives and sintering flux, to obtain a ceramic dielectric that meets requirements of COG characteristics. The ceramic dielectric material meets environmental requirements, has high dispersion and good molding performance. Moreover, it can be matched with nickel internal electrodes and provides stable high frequency characteristics. In the process of manufacturing MLCC, the ceramic dielectric material can be sintered under reducing atmosphere at temperatures between 1120° C. and 1200° C. While the following embodiments are described in considerable details, they are not intended to restrict or in any way limit the scope of the present invention. The formula of the ceramic dielectric can be chosen as per specific conditions and has no substantial effects on the result.

The ceramic composition proposed in the present invention is a reduction-resistant high-frequency and low-dielectric-constant ceramic dielectric material matched with nickel-electrode comprising main crystalline phase, modifying additive and sintering flux. The main crystalline phase is $MgZr_xSi_{(1-x)}O_3$, wherein $0.05 \leq x \leq 0.15$. The modifying additive is one or more of $MnO_2$, $Al_2O_3$, CaO, $Bi_2O_3$ and $TiO_2$. And the sintering flux is one or more of $B_2O_3$, $SiO_2$, ZnO, $Li_2O$, $K_2O$ and BaO.

The First Embodiment

A reduction-resistant high-frequency and low-dielectric-constant ceramic dielectric material is obtained as followed: ball-milling and evenly mixing raw materials (>99.5% purity), 1.0 mol $Mg(OH)_2$, 0.9 mol $SiO_2$ and 0.1 mol $ZrO_2$, and calcining the mixture at 1170° C. for 3 hours to obtain a main crystalline phase formulated as $MgSi_{0.9}Zr_{0.1}O_3$; then adding modifying additive and sintering flux according to the predetermined ratios given in Table 1.

TABLE 1

Formula of main crystalline phase, modifying additives and sintering flux

| No. | Main crystalline phase $Mg_{0.8}Ba_{0.2}Si_{0.8}Zr_{0.2}O_3$ (mol %) | Modifying additives (mol %) | | | | | Sintering flux (mol %) | | | | | |
|---|---|---|---|---|---|---|---|---|---|---|---|---|
| | | $Al_2O_3$ | $TiO_2$ | $MnO_2$ | CaO | $Bi_2O_3$ | $B_2O_3$ | ZnO | $SiO_2$ | $Li_2O$ | $K_2O$ | BaO |
| 1 | 85 | 3.0 | 1.0 | 3.0 | 0 | 0 | 3.0 | 4.0 | 1.0 | 0 | 0 | 0 |
| 2 | 86 | 2.5 | 0.8 | 2.0 | 1.0 | 0 | 2.2 | 3.5 | 2.0 | 0 | 0 | 0 |
| 3 | 87 | 2.0 | 0.6 | 1.0 | 0.8 | 0 | 2.0 | 3.0 | 3.0 | 0.6 | 0 | 0 |
| 4 | 88 | 2.0 | 0 | 1.0 | 0 | 5.0 | 1.0 | 3.0 | 0 | 0 | 0 | 0 |
| 5 | 89 | 2.0 | 0 | 1.0 | 0.4 | 3.0 | 1.2 | 2.4 | 0 | 0 | 1.0 | 0 |
| 6 | 90 | 2.0 | 0 | 1.0 | 0 | 0 | 1.0 | 3.0 | 2.0 | 0.4 | 0.6 | 0 |
| 7 | 91 | 2.0 | 0 | 1.0 | 0.2 | 0 | 1.0 | 3.0 | 0 | 0.8 | 0.3 | 0.7 |
| 8 | 92 | 2.0 | 0 | 0.5 | 0 | 0 | 0.5 | 2.0 | 1.5 | 1.0 | 0 | 0.5 |
| 9 | 93 | 1.5 | 0 | 0.5 | 0 | 2.5 | 0.5 | 1.5 | 0.5 | 0 | 0 | 1.0 |
| 10 | 94 | 1.0 | 0 | 0.5 | 0 | 1.5 | 0.5 | 1.5 | 0.7 | 0 | 0 | 0.8 |
| 11 | 95 | 1.0 | 0 | 0.5 | 0 | 0 | 0.5 | 1.0 | 1.0 | 0.5 | 0.1 | 0.4 |

The MLCC dielectric ceramic powder is obtained in accordance with the dielectric ceramic production procedures commonly used by the skilled in the art. According to manufacturing procedures of chip MLCC, organic binder and solvent such as ethanol are added to the ceramic powder to produce ceramic slurry, which is later casted to form ceramic green sheets. Next, nickel internal electrode pattern is printing on the ceramic green sheets, with alternately stacking the sheets until the required number of layers is reached to form a laminated body. The laminated body is then compressed and diced into chip-shape ceramic bodies. MLCC chips are subsequently fired at a temperature between 200~300° C. in order to remove the organic binders and solvents, followed by sintering in a reducing atmosphere at a temperature between 1120~1200° C. for 2.5~5 hours. After surface polishing, both terminals of the capacitor are then mounted with a pair of external copper electrodes to connect with the internal electrodes. External electrodes are further fired at a temperature between 830~900° C. At last, MLCC are finished after undergoing electroplating and other procedures.

Said MLCC is featured by stable capacitance and excellent electrical properties. The capacitance and dielectric loss of MLCC are measured with an electrical bridge (HP4278) at 1 MHz, 1.0V (AC) at room temperature (25° C.). The insulation resistance is measured with a fast insulation resistance meter (SF2512) by applying 100V rated DC voltage for 10 seconds. The dielectric constant-temperature coefficient is measured with a high and low temperature testing chamber at temperatures between −55° C. to +125° C. The electrical properties of MLCC are shown in Table 2 in corresponding to the ceramic dielectric material formulas 1~11.

TABLE 2

Electrical Properties of MLCC made from the aforementioned ceramic dielectric material

| No. | Dielectric constant | Dielectric loss DF ($\times 10^{-4}$) | Temperature coefficient −55~+125 C. ° (ppm/C. °) | Insulation resistance ($\Omega$) |
|---|---|---|---|---|
| 1 | 8.7 | 0.8 | −12~21 | $>10^{11}$ |
| 2 | 9.1 | 0.7 | 3~16 | $>10^{11}$ |
| 3 | 9.5 | 0.9 | 10~22 | $>10^{11}$ |
| 4 | 9.6 | 1.3 | −5~10 | $>10^{11}$ |
| 5 | 8.8 | 1.5 | 2~13 | $>10^{11}$ |
| 6 | 9.1 | 1.1 | 12~17 | $>10^{11}$ |
| 7 | 10.2 | 0.6 | −11~12 | $>10^{11}$ |
| 8 | 11.5 | 0.9 | 8~14 | $>10^{11}$ |
| 9 | 10.6 | 1.2 | −7~11 | $>10^{11}$ |
| 10 | 11.7 | 1.0 | −8~16 | $>10^{11}$ |
| 11 | 9.8 | 1.4 | 10~21 | $>10^{11}$ |

What is claimed is:

1. A high-frequency and low-dielectric-constant ceramic dielectric material comprising:
   a main crystalline phase;
   a modifying additive; and
   a sintering flux,
   wherein said main crystalline phase is $MgZr_xSi_{(1-x)}O_3$ with $0.05 \leq x \leq 0.15$,
   wherein said modifying additive is selected from the group consisting of $MnO_2$, $Al_2O_3$, CaO, $Bi_2O_3$, and $TiO_2$, and
   wherein said sintering flux is selected from the group consisting of $B_2O_3$, $SiO_2$, ZnO, $Li_2O$, $K_2O$, and BaO.

2. The high-frequency and low-dielectric-constant ceramic dielectric material of claim 1,
   wherein said main crystalline phase is in a range of 85-95 mol %,
   wherein said modifying additive is in a range of 1.5-13 mol %, and
   wherein said sintering flux is in a range of 1.5-13 mol %.

3. The high-frequency and low-dielectric-constant ceramic dielectric material of claim 2, wherein said modifying additive comprises $MnO_2$ 0.5-3.0 mol %, $Al_2O_3$ 1.0-3.0 mol %, CaO 0-1.0 mol %, $Bi_2O_3$ 0-5.0 mol %, and $TiO_2$ 0-1.0 mol %.

4. The high-frequency and low-dielectric-constant ceramic dielectric material of claim 2, wherein said sintering flux comprises:
   $B_2O_3$ 0.5-3.0 mol %,
   $SiO_2$ 0-3.0 mol %,
   ZnO 1.0-4.0 mol %,
   $Li_2O$ 0-1.0 mol %,
   $K_2O$ 0-1.0 mol %, and
   BaO 0-1.0 mol %.

5. The high-frequency and low-dielectric-constant ceramic dielectric material of claim 1, wherein said main crystalline phase is obtained by ball-milling and evenly mixing $Mg(OH)_2$, $SiO_2$, and $ZrO_2$ to yield a mixture, and then pre-calcining the mixture at a temperature between 1050° C. and 1200° C.

6. The high-frequency and low-dielectric-constant ceramic dielectric material of claim 2, wherein said main crystalline phase is obtained by ball-milling and evenly mixing $Mg(OH)_2$, $SiO_2$, and $ZrO_2$ to yield a mixture, and then pre-calcining the mixture at a temperature between 1050° C. and 1200° C.

7. The high-frequency and low-dielectric-constant ceramic dielectric material of claim 1, wherein the ceramic dielectric material meets requirements of COG characteristics and has a dielectric constant between 8 and 12.

8. The high-frequency and low-dielectric-constant ceramic dielectric material of claim 2, wherein the ceramic dielectric material meets requirements of COG characteristics and has a dielectric constant between 8 and 12.

9. The high-frequency and low-dielectric-constant ceramic dielectric material of claim 3, wherein the ceramic dielectric material meets requirements of COG characteristics and has a dielectric constant between 8 and 12.

10. The high-frequency and low-dielectric-constant ceramic dielectric material of claim 4, wherein the ceramic dielectric material meets requirements of COG characteristics and has a dielectric constant between 8 and 12.

11. The high-frequency and low-dielectric-constant ceramic dielectric material of claim 5, wherein the ceramic dielectric material meets requirements of COG characteristics and has a dielectric constant between 8 and 12.

12. A method for producing a MLCC made from the high-frequency and low-dielectric-constant ceramic dielectric material of claim 1, comprising:
   preparing a ceramic slurry by the high-frequency and low-dielectric-constant ceramic dielectric material;
   fabricating a of ceramic dielectric green sheets from the ceramic slurry;
   alternately printing and stacking internal electrodes made from nickel or nickel alloy and dielectric layers to form a briquette;
   drying the briquette;
   laminating the briquette to a lamination;
   dicing the lamination into chips with required configuration;
   binder-removing from the chips by heat-treating MLCC chips at 200-300° C. to remove organic binders and solvent;
   sintering the chips for 2.5-5 h under reducing atmosphere at a temperature between 1120° C. to 1200° C.;
   chamfering the chips;
   coating each of two ends of the chips for electrical conductivity to yield external electrodes;
   sintering the external electrodes at a temperature between 830° C. to 900° C.; and
   electroplating the external electrodes.

13. A method for producing a MLCC made from the high-frequency and low-dielectric-constant ceramic dielectric material of claim 2, comprising:
   preparing a ceramic slurry by the high-frequency and low-dielectric-constant ceramic dielectric material;
   fabricating a of ceramic dielectric green sheets from the ceramic slurry;

alternately printing and stacking internal electrodes made from nickel or nickel alloy and dielectric layers to form a briquette;
drying the briquette;
laminating the briquette to a lamination;
dicing the lamination into chips with required configuration;
binder-removing from the chips by heat-treating MLCC chips at 200-300° C. to remove organic binders and solvent;
sintering the chips for 2.5-5 h under reducing atmosphere at a temperature between 1120° C. to 1200° C.;
chamfering the chips;
coating each of two ends of the chips for electrical conductivity to yield external electrodes;
sintering the external electrodes at a temperature between 830° C. to 900° C.; and
electroplating the external electrodes.

14. A method for producing a MLCC made from the high-frequency and low-dielectric-constant ceramic dielectric material of claim 3, comprising:
preparing a ceramic slurry by the high-frequency and low-dielectric-constant ceramic dielectric material;
fabricating a of ceramic dielectric green sheets from the ceramic slurry;
alternately printing and stacking internal electrodes made from nickel or nickel alloy and dielectric layers to form a briquette;
drying the briquette;
laminating the briquette to a lamination;
dicing the lamination into chips with required configuration;
binder-removing from the chips by heat-treating MLCC chips at 200-300° C. to remove organic binders and solvent;
sintering the chips for 2.5-5 h under reducing atmosphere at a temperature between 1120° C. to 1200° C.;
chamfering the chips;
coating each of two ends of the chips for electrical conductivity to yield external electrodes;
sintering the external electrodes at a temperature between 830° C. to 900° C.; and
electroplating the external electrodes.

15. A method for producing a MLCC made from the high-frequency and low-dielectric-constant ceramic dielectric material of claim 4, comprising:
preparing a ceramic slurry by the high-frequency and low-dielectric-constant ceramic dielectric material;
fabricating a of ceramic dielectric green sheets from the ceramic slurry;
alternately printing and stacking internal electrodes made from nickel or nickel alloy and dielectric layers to form a briquette;
drying the briquette;
laminating the briquette to a lamination;
dicing the lamination into chips with required configuration;
binder-removing from the chips by heat-treating MLCC chips at 200-300° C. to remove organic binders and solvent;
sintering the chips for 2.5-5 h under reducing atmosphere at a temperature between 1120° C. to 1200° C.;
chamfering the chips;
coating each of two ends of the chips for electrical conductivity to yield external electrodes;
sintering the external electrodes at a temperature between 830° C. to 900° C.; and
electroplating the external electrodes.

16. A method for producing a MLCC made from the high-frequency and low-dielectric-constant ceramic dielectric material of claim 5, comprising:
preparing a ceramic slurry by the high-frequency and low-dielectric-constant ceramic dielectric material;
fabricating a of ceramic dielectric green sheets from the ceramic slurry;
alternately printing and stacking internal electrodes made from nickel or nickel alloy and dielectric layers to form a briquette;
drying the briquette;
laminating the briquette to a lamination;
dicing the lamination into chips with required configuration;
binder-removing from the chips by heat-treating MLCC chips at 200-300° C. to remove organic binders and solvent;
sintering the chips for 2.5-5 h under reducing atmosphere at a temperature between 1120° C. to 1200° C.;
chamfering the chips;
coating each of two ends of the chips for electrical conductivity to yield external electrodes;
sintering the external electrodes at a temperature between 830° C. to 900° C.; and
electroplating the external electrodes.

17. A method for producing a MLCC made from the high-frequency and low-dielectric-constant ceramic dielectric material of claim 6, comprising:
preparing a ceramic slurry by the high-frequency and low-dielectric-constant ceramic dielectric material;
fabricating a of ceramic dielectric green sheets from the ceramic slurry;
alternately printing and stacking internal electrodes made from nickel or nickel alloy and dielectric layers to form a briquette;
drying the briquette;
laminating the briquette to a lamination;
dicing the lamination into chips with required configuration;
binder-removing from the chips by heat-treating MLCC chips at 200-300° C. to remove organic binders and solvent;
sintering the chips for 2.5-5 h under reducing atmosphere at a temperature between 1120° C. to 1200° C.;
chamfering the chips;
coating each of two ends of the chips for electrical conductivity to yield external electrodes;
sintering the external electrodes at a temperature between 830° C. to 900° C.; and
electroplating the external electrodes.

* * * * *